Oct. 30, 1962    W. FISCHER ET AL    3,060,510
PROCESS FOR CONVERTING FUSIBLE MATERIALS, SOLID AT
ORDINARY TEMPERATURES, INTO SPHERICAL GRANULES
Filed June 12, 1961

INVENTORS

BY Oscar B. Brumback.
their ATTORNEY.

3,060,510
PROCESS FOR CONVERTING FUSIBLE MATERIALS, SOLID AT ORDINARY TEMPERATURES, INTO SPHERICAL GRANULES
Walter Fischer, Jan L. Crutzen, and Heinzpeter Nilles, Duisburg-Meiderich, Germany, assignors, by mesne assignments, to Koppers Company, Inc., a corporation of Delaware
Filed June 12, 1961, Ser. No. 116,579
1 Claim. (Cl. 18—47.2)

This invention concerns a process for the granulation of fusible materials, solid at ordinary temperatures, in particular pitch, synthetic resins, and the like (cooled product), into small spheres by introducing a stream of melt into a medium which acts to solidify by allowing the melt to freeze (cooling medium).

The granulation of fusible materials, solid at ordinary temperatures, for example coal tar pitch, thermoplastic synthetic plastics, natural and synthetic resins, etc., is known and has been attempted by many processes. The granulation of such materials into spheres of diameters in the range of, for example, one to ten millimeters in diameter and of great uniformity of diameter, is not yet known. Also, methods to achieve this are not available; the use of high towers in which the melt is dropped through an appreciably high stream of cooling air such as is used, for example, in making glue pearls, is not practical for the granulation of relatively low cost materials such as pitch, resins, plastics, and the like, because of the high costs. A process is known (United States Patent No. 1,762,693) by which melts are granulated to a relatively irregular particle of various sizes by the introduction of streams of the melt into a liquid zone at a temperature above the melting point of the melt material to be granulated, whereupon drops of the substances form which, dependent upon their temperature and density, fall into a liquid zone having a sharply different temperature where the droplets to a degree become solidified, whereupon they then again fall, dependent upon temperature and density, into a third zone of abruptly lower temperature in which they freeze, and out of which they are drawn. Quite apart from the unavoidable irregularity of form and size of the spherical granules formed in this way, practical operation is difficult because of the requirement of superimposed layers of liquids of different temperatures and densities under the conditions of high temperature differences (the upper entrance zone having a temperature close to 100°, the lower third zone temperature of about 20°) so that irregularities, for example lens formed or shrunken granules, are unavoidable. In addition, the disadvantage exists that this process cannot be operated continuously since the maintence of zones of liquids of different temperatures and densities under one another makes this impossible; also, according to this process, the melt before the entrance of the liquid must pass through the air in order to drop into the liquid in which the small sphere is formed in the upper hot layer. With materials such as pitch, this necessity is a disadvantage since, under such conditions, pitch fumes form.

All these disadvantages are eliminated by the present invention through the formation of small spheres of regular form and size, and whereby their diameter can to a certain degree be predetermined.

According to this invention, a stream of the material to be granulated at a temperature substantially above its freezing point is introduced continuously into a cooling medium which, at the point of entrance, also has a temperature which lies substantially above this freezing temperature, and advantageously at about the same temperature of the material to be cooled. During its passage in the cooling medium, the stream breaks into drops under the action of surface and interfacial tensions. This breaking up of the stream begins by contractions and is dependent further upon the kinetic energy of the stream, its temperature, the temperature gradient along the stream, its speed, its viscosity, the form materials and size of the nozzle from which the stream flows, and the interfacial tension of the material to be cooled in the cooling medium. According to this invention, the break-up of the stream flow, that is, the distance between the constrictions and thus the mass of the granules which form, is not only allowed to depend upon its own fluctuations, but is also initiated by subjecting the stream to oscillations of relatively low frequency (about between two and ten cycles/second) by known methods, selected as desired. Thereby, the break-up of the stream is accelerated or brought about and regulated, and its regularity is made certain.

Depending upon the directions of flow of the material to be cooled and of the cooling medium, four types of operation of the process are possible:

*Type 1.*—The material to be cooled flows vertically from above to below, the cooling medium flows countercurrently upwards; in this type the specific gravity of the material to be cooled must be so much larger than that of the cooling medium so that the granules which form sink under the influence of the gravity against the buoyant force of the upward-flowing cooling medium.

By suitable selection of the entrance temperature, the amount and rate of flow of the cooling medium at the temperature gradient of cooling medium and of material to be cooled, conditions are so established that the granules which result from the break-up of the stream have time, that is, have flowed through such a distance, that they form themselves into spheres while they are still fluid or plastic, and then harden in the cooler portions of the cooling medium, and finally reach approximately the entrance temperature of the cooling medium, that is, cool to room temperature. The time necessary and the length of travel of the granules necessary for this depend upon their size, and their specific and latent heats of freezing, as well as on all of the factors which influence heat exchange.

It has been found that in practical application of the invention, a height of fall of a few meters at a rate of descent of under one meter per second is satisfactory.

*Type 2.*—The material to be cooled flows from above downwards, the cooling medium concurrently with it. All of the statement made previously apply here, however, the heat cannot be extracted directly by means of the cooling medium. The chamber or other apparatus in which the two materials flow must be cooled from the outside.

*Type 3.*—The material to be cooled flows from below upward, the cooling material countercurrently downwards; the specific gravity of the material to be cooled must be low enough so that the buoyancy of the granules which form overcome the force of flow of the downwardly-flowing cooling medium. The heat exchange, the formation of the spherical particles and their freezing takes place as in Type 1, however, going forward from below upward.

*Type 4.*—The material to be cooled flows from below upward, the cooling medium concurrently with it. Also, here as in Type 2, indirect cooling is necessary.

In all types of operation, the temperatures along the stream of the material to be cooled, along the path of the granules, and along the stream of the cooling materials never change abruptly, but always steadily according to gradients which are determined by the existing heat transfer conditions.

During operations according to this invention, the spherical granules fall (or similarly rise to the top) at a uniform rate so that a running together or sticking together of the small spheres does not occur. It is recommended that the process of this invention be so operated that the stream enters the liquid below its upper surface.

The art and form by which the oscillations are impressed on the inflowing stream is not important to the process of this invention.

For example, one can make use of oscillation generators of any desired type of manufacture, one can rhythmically shake the inlet arrangement or the inlet tube can be made movable and rapped; finally one can cause desired pressure variation (pulsations) at regular intervals in the stream.

The initiation of oscillations has the additional advantage that, with materials which are difficult to granulate, for example those with a flat viscosity temperature curve, the break-up of the stream is appreciably eased, or even made possible, for example, under those conditions under which self-induced oscillations of the stream do not lead to stream separation. Thus, the sizes and uniformity of the spheres can be improved for such materials since the cohesion which works against stream break-up is opposed.

For the same conditions of granulation with respect to size, form and uniformity, it is possible therefore to introduce the stream of material to be cooled at lower temperatures when oscillations are induced in it than when the material is introduced without induced oscillations.

With many materials, stream break-up definitely does not take place without induced oscillations; a condition which is easy to achieve according to the invention.

The formation of granules of almost completely spherical form has the advantage—over granules which are more or less irregularly formed—that these small spheres have optimum properties for handling during storage, transportation, and further processing. Drying of the spheres is easy because of their smooth surfaces and their coarse granulation, and can be carried out with only small use of heat. An undesired comminution of the spheres through rubbing against each other and by breaking is not to be feared. Sticking together and the decreased flowability of the spheres is greatly diminished because they lie in point contact.

It is of appreciable importance that in the operation of the process of this invention in a continuous manner, that the heat to be removed from the process (latent heat of freezing, sensible heat) is removed at the highest temperature level, namely close to the temperature of the inflowing streams. The cooling medium flows away at this temperature. A recovery of useful heat is thereby possible.

If, for example, water is recommended as the cooling medium, and the temperature of the stream to be cooled at the point of inlet is 160° C., then the process is carried out under a pressure of 13 atmospheres, and one obtains the heat which is removed in the form of hot water at 13 atmospheres or as saturated steam after pressure release.

A vaporization of the cooling medium at its highest temperature, that is, at the inlet of the material to be cooled, is thereby prevented according to a recommended method of carrying out the process. This can be done by operating under pressure.

Should the introduction of oscillations into the incoming stream of material to be cooled make possible a decrease in the stream temperature, this brings about an advantage of a decreased pressure required to prevent boiling of the cooling medium.

According to another manner of carrying out the invention, the pressure can be so maintained that at the point of inlet of the material to be cooled there is a vapor cushion and the cooling medium is withdrawn in vapor form.

According to a further recommended manner of carrying out the invention, substances are added to the cooling medium which decrease the interfacial tension.

The above and further objects and novel features of the invention will appear more fully from the following detailed description when the same is read in connection with the accompanying drawings. It is to be especially understood, however, that the drawings are not intended as a definition of the invention but are for the purpose of illustration.

The invention will now be more fully explained in connection with the accompanying drawings in which.

Figure 1:
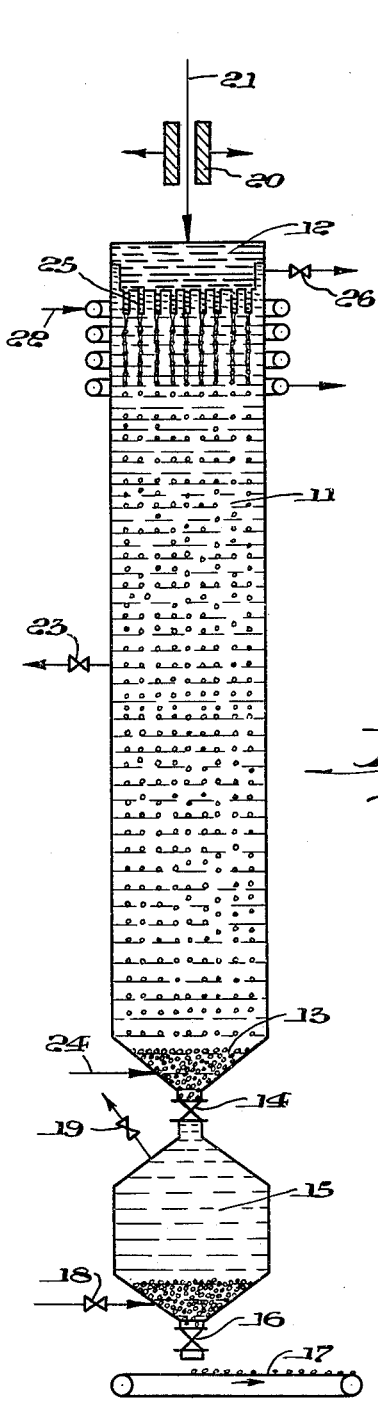
FIGURE 1 shows a recommended form of the apparatus for carrying out an operation of Type 1.

Number 11 is a chamber filled with the cooling material closed at its upper end with a nozzle chamber 12 in which the nozzles 25 are arranged. At its lower end, the chamber narrows into cone 13, and is joined through slide gate 14 to a lock chamber 15, also filled with a cooling medium, which in its turn can be opened to the outside through a slide gate 16. Below the slide 16, there is transport means 17 which, for example, can be made out of a sieve band, and on which the wet granules can be extensively dewatered.

Figure 2:
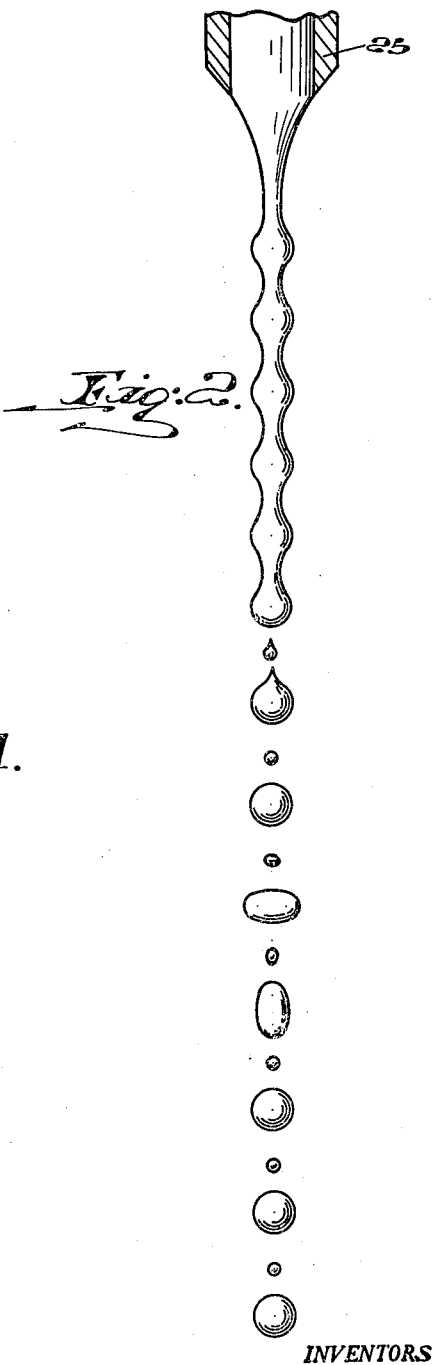
FIGURE 2 shows in a general manner the way the streams in FIGURE 1 break into drops.

In operation Type 1, the material to be granulated is introduced in molten liquid form through inlet 21 into the nozzle chamber 12 from above, and distributed through nozzles 25 into streams. Oscillation generator 20 causes the streams which flow out of the nozzles 25 under the surfaces of the cooling medium to oscillate longitudinally; the streams constrict themselves as shown in FIGURE 2 and break into drops.

The drops sink to the bottom countercurrently through the cooling medium, whereupon, under the influence of interfacial tension, they take a spherical, form and, in consequence of the temperature gradient, they finally solidify.

The spherically shaped granules accumulate in cone 13 and, by combined action of the slide valves 14 and 16 and lock chamber 15, are removed to the outside and carried away by the transport band 17. The cooling medium is introduced by means of a pump (not shown) through pipe 24, and away through pipe 26.

The temperature gradient required for the granulation of the material in process can be regulated by removal of a side stream 23.

With an arrangement such as is shown in FIGURE 1, operation can be carried out completely continuously up to the point of intermittent removal of the granules through the lock. This removal can also be made completely automatic in that the emptying of the lock chamber, its refilling with the cooling medium, and also the operation of the slide valves 14 and 16 can be regulated by the accumulation of granules in the cone 13. For this purpose, the cooling medium for refilling the lock chamber 15 is added through a special pipe 18. Pipe 19 serves for the removal of air during the filling of the lock chamber, and is closed, as soon as cooling medium flows through it. Should the cooling medium be in vapor form, at atmospheric temperature when it is at the temperature at which the material to be granulated flows into the apparatus, then the apparatus can be operated under such a superpressure that the cooling material does not boil. One can also so regulate the pressure that at the upper end of the chamber, directly underneath the nozzles, a steam blanket exists, in which case the cooling material is drawn off through pipe 26 as vapor whose heat can be used for heating purposes.

To start the operation of the apparatus of FIGURE 1, heating means 22 are provided at the upper end of the chamber, for example, a heating coil which heats the cooling medium just below the nozzle chamber 12 to the feed temperature of the material to be cooled. During steady operation, this heating medium is shut off since the heat available from the material to be cooled is sufficient to maintain the desired temperature.

The temperature at which the material to be cooled falls into the cone 13 can be influenced by the selection of the temperature at which the cooling medium flows in through pipe 24. It may be advantageous to select this at a temperature higher than room or air temperature, since the granules together with the moisture they carry after their release from the lock chamber 15 further cool in the air. Thus, the cooling medium which still adheres to the surfaces of the granules evaporates especially rapidly because of its higher temperature.

The following example of a granulation was carried out in an apparatus approximating FIGURE 1:

EXAMPLE

A special pitch with an especially flat viscosity curve (softening point 90° C.) was introduced under an operating pressure of 13 atmospheres into countercurrently flowing water which, at the point of inlet of the stream, had a temperature of 160° C., while the temperature of the melt was 180° C.

The temperature of the water decreased regularly from the point of introduction of the material to be cooled, that is, at the underwater nozzle down to a temperature of about 20° C. at the point where the formed and solidified small spheres were removed.

Oscillations of about 1 to 3 cycles per second were impressed on the injected stream through pressure fluctuations.

A product of spherically formed granules with the flowing sieve analysis was obtained.

| | | Percent |
|---|---|---|
| >6 | mm | 99.25 |
| >3 | mm | 0.50 |
| >2.5 | mm | 0.50 |
| <2.5 | mm | 0.20 |
| | | 100.00 |

The granules which were obtained, even the finest sizes, were nicely spherical, smooth, and glistening black. With the same starting material and under the same conditions but without the induced oscillations, a product of spherically formed granules with the following sieve anaylsis was obtained:

| | | Percent |
|---|---|---|
| >6 | mm | 28.45 |
| >3 | mm | 58.00 |
| >2.5 | mm | 6.83 |
| >2.0 | mm | 3.30 |
| <2.0 | mm | 3.42 |
| | | 100.00 |

Here the granules obtained were only partly spherical, they were partly lens formed and shrunken; the fine sizes were abundant and very irregular.

We claim:

A method of producing spheres of a pitch material which comprises flowing a pitch having a softening point of about 90° C. under an operating pressure of 13 atmospheres and a temperature of 180° C. as a small diameter stream into a countercurrently flowing stream of water which initially begins the stream flow at a temperature of 20° C. and ends the stream flow at a temperature of 160° C., the highest temperature of the water being substantially the highest temperature of the pitch, and subjecting said pitch to pressure fluctuations to cause longitudinal oscillations of about 1–3 cycles per second, whereby free-flowing spheres of pitch are formed.

References Cited in the file of this patent

UNITED STATES PATENTS

| | | |
|---|---|---|
| 1,378,084 | Bacon et al. | May 17, 1921 |
| 1,393,383 | Linebarger | Oct. 11, 1921 |
| 1,612,167 | Beardsley et al. | Dec. 28, 1926 |
| 1,762,693 | Linebarger | June 10, 1930 |
| 2,510,574 | Greenhalgh | June 6, 1950 |
| 2,570,423 | Batchelder et al. | Oct. 9, 1951 |
| 2,572,998 | Eisner | Oct. 30, 1951 |
| 2,574,357 | Stammer et al. | Nov. 6, 1951 |
| 2,714,224 | Schaub | Aug. 2, 1955 |
| 2,887,723 | Hallie et al. | May 26, 1959 |
| 2,923,033 | Baldwin et al. | Feb. 2, 1960 |
| 2,931,067 | Delaloyte et al. | Apr. 5, 1960 |